United States Patent
Matsunaga et al.

(10) Patent No.: US 7,948,647 B2
(45) Date of Patent: May 24, 2011

(54) PRODUCTION WORKFLOW INTEGRATION SYSTEM

(75) Inventors: Sabrina Pui-Wah Matsunaga, Oak Park, CA (US); Francisco M. Valeriano, Torrance, CA (US); Amos Y. Kuo, Torrance, CA (US); Philip C. Rose, Sodus, NY (US); Tong Sun, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 1038 days.

(21) Appl. No.: 11/731,391

(22) Filed: Mar. 30, 2007

(65) Prior Publication Data

US 2008/0239369 A1 Oct. 2, 2008

(51) Int. Cl.
*G06F 3/12* (2006.01)
*G06K 15/00* (2006.01)

(52) U.S. Cl. ............... 358/1.15; 358/1.16; 358/1.18; 358/1.6

(58) Field of Classification Search ............... 358/1.15, 358/1.16, 1.17, 1.18, 1.13, 1.1, 1.6, 1.9, 1.14, 358/1.2, 400, 401, 402, 403, 404, 405, 407, 358/408, 437, 442, 443, 444, 468, 472, 474, 358/296, 1.5, 1.7, 1.8, 505, 473, 475, 478, 358/482, 483, 486, 487, 497; 347/2, 3, 5, 347/14, 23; 399/1, 8, 9, 10; 710/8, 13, 15, 710/62, 72, 73, 74; 283/85; 340/10.41, 539.1; 382/312, 313, 314, 317
See application file for complete search history.

(56) References Cited

U.S. PATENT DOCUMENTS

| 5,287,194 | A | * | 2/1994 | Lobiondo | 358/296 |
| 7,844,864 | B2 | * | 11/2010 | Valeriano et al. | 714/48 |
| 2005/0029353 | A1 | * | 2/2005 | Isemura et al. | 235/454 |
| 2005/0182757 | A1 | * | 8/2005 | Hull et al. | 707/3 |
| 2006/0017950 | A1 | * | 1/2006 | Ikegami et al. | 358/1.13 |
| 2006/0226980 | A1 | * | 10/2006 | Rai et al. | 340/572.1 |
| 2006/0227366 | A1 | * | 10/2006 | Hohensee et al. | 358/1.15 |
| 2008/0030746 | A1 | * | 2/2008 | Matsunaga et al. | 358/1.1 |
| 2009/0314836 | A1 | * | 12/2009 | Kothari et al. | 235/385 |

FOREIGN PATENT DOCUMENTS

JP 2005201968 A * 7/2005
JP 2008061078 A * 3/2008

* cited by examiner

*Primary Examiner* — Dov Popovici
(74) *Attorney, Agent, or Firm* — Alix, Yale & Ristas, LLP (57) ABSTRACT

A production workflow integration system for a print shop includes multiple workstations, a printing device and a computer in communication with at least one of the workstations and the printing device. Each workstation includes a data collection module having at least one of an electronic data storage device reader. The printing device prepares a job ticket for each print job to be produced by the print shop. The computer stores print job instructions for the print job on an electronic data storage device attached to the job ticket and stores the identification information of the electronic data storage device in a field of a print job record in a database stored in the computer.

28 Claims, 5 Drawing Sheets

PRODUCTION WORKFLOW INTEGRATION SYSTEM

BACKGROUND

This disclosure relates generally to printing apparatus and methods for printing. More particularly, the present disclosure relates to printing apparatus and methods for printing in a print shop.

Various production systems such as Enterprise Resource Planning (ERP), Computer Integrated Manufacturing (CIM), Business Activity Monitoring (BAM), and dashboards are highly dependent upon data about the production environment. Such fully integrated systems implement a computerized and networked system to collect data from the various pieces of equipment in the shop. The problem is that not all pieces of equipment in a typical shop are or can be connected to a computer. Additionally, print shop workflows typically include many manual operations. As such, large amounts of data must be manually captured and entered into the systems after the fact. Process data that is not manually captured and entered into the system is simply lost through non-capture. Typical solutions for manual data capture, such as paper job tickets are labor-intensive, costly and not timely.

Integration of the equipment and processes utilized in production printing operations requires communication of job information from a centralized Management Information System (MIS) to each one of the pieces of equipment in the print shop as well as collection of job status information and resource consumption information from the processes to the MIS. Achieving this level of integration is difficult due to the lack of standards and common interfaces among the multiple pieces of equipment used in any typical print shop. Some advances have been made with respect to standards with the adoption of Job Definition Format (JDF). However, this standard has not yet been adopted across all manufacturers of print shop equipment. Even with complete adoption of the standard, manual processes and legacy equipment will still present problems.

Conventional solutions to this problem have included installing computer systems in each of the process workstations and requiring operators to enter information about the job being processed. Such manual data collection usually happens after the fact once the operator has finished processing a job. This process typically requires much operator interaction, such as searching for the correct record, tabbing to the correct field in the record, etc., and is therefore time consuming, distracting the skilled operators from the value added tasks of processing the job instructions. The level of integration and the amount of information that can be communicated using this solution is also limited by conventional keyboard methodologies.

SUMMARY

There is provided a production workflow integration system for a print shop comprising a plurality of workstations, a printing device and a computer. Each workstation includes a data collection module having at least one electronic data storage device reader. The printing device is adapted to print a job ticket for each print job to be produced by the print shop. The computer is in communication with at least one of the workstations and the printing device. The computer stores print job instructions for the print job on an electronic data storage device attached to the job ticket associated with the print job, and stores the identification information of the electronic data storage device in a field of a print job record in a database stored in the computer.

The printing device includes a printer, to print a job instruction page, and an electronic data storage device attachment device for attaching an electronic data storage device to the job ticket.

The data collection module of at least one of the workstations includes a general electronic data storage device reader, an output electronic data storage device reader, and an input electronic data storage device reader. The input electronic data storage device reader may comprise a document tray, having an electronic data storage device reader, adapted to receive the job tickets for the print jobs that are to be processed in the workstation. The output electronic data storage device reader may comprise a document tray, having an electronic data storage device reader, adapted to receive the job tickets for print jobs that have completed processing in the workstation.

The production workflow integration system may further comprise at least one tracking page including an electronic data storage device associated with the print job. The electronic data storage device may also be associated with one of the processes to be performed for the print job.

The production workflow integration system further comprises a digital pen and at least one data collection station. The data collection station includes a data collection module having at least one electronic data storage device reader. The job ticket is formatted to be read by the digital pen.

There is also provided a method of integrating production work flow in a print shop having a plurality of workstations, where each of the workstations performs at least one print job task. The method comprises printing a job ticket for each print job received by the print shop, associating an electronic data storage device attached to the job ticket with the print job, logging in the job ticket at each workstation performing work on the print job by scanning identification information stored in the electronic data storage device attached to the job ticket, and executing the print job task performed by the workstation.

The method further comprises opening a record for the print job in a database stored in a computer and storing the identification information of the electronic data storage device in a field of the print job record.

The method further comprises transmitting the print job data from the workstation to the computer if the workstation is connected to the computer. If the workstation is not connected to the computer, the print job data is recorded in the job ticket electronic data storage device and is later transferred to the computer when the print job is moved to a workstation that is connected to the computer or at the completion of the print job.

The print job instructions for the print job are stored in the electronic data storage device and in a field of the print job record.

The method may further comprise reading the job instructions stored in the job ticket electronic data storage device and comparing the job instructions read from the job ticket electronic data storage device to job instructions stored in a controller of the workstation. If the job instructions read from the job ticket electronic data storage device are not identical to the job instructions stored in the controller of the workstation, the job instructions read from the job ticket electronic data storage device are saved in the controller of the workstation. The job instructions stored in the controller of the workstation are then executed.

The method may further comprise determining whether the print job task performed at the workstation is the next process required in the proper execution of the job instructions. If the print job task performed at the workstation is not the print job task that should be performed next for the print job, the operator is directed to log-out the print job from the workstation. If the print job task performed at the workstation is the print job task that should be performed next for the print job, the print job task is executed.

The method may further comprise initiating a job timer associated with the print job after the job ticket is logged-in at the workstation. When the print job task is completed, the print job is logged-out from the workstation by scanning the electronic data storage device. The residence time of the print job at the workstation is then computed using the job timer.

The method may further comprise printing the job ticket in a digital pen readable format and annotating print job information on the job ticket with a digital pen. Periodically the digital pen is docked at one of the data collection stations as the print job is processed in the print shop, the annotated print job information read by the digital pen, and the job ticket identification information scanned by the data collection station reader is transmitted to the computer and stored in the print job record of the database.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

With reference to the drawings wherein like numerals represent like parts throughout the several figures, a production workflow integration system in accordance with the present disclosure is generally designated by the numeral 10, 10'. The production workflow integration system 10, 10' is based on the automated collection of information on the print shop operations using an electronic data storage device 12 (EDSD). The EDSD 12 is attached to a job instruction page or job ticket 14 associated with print job processed by the print shop. An "electronic data storage device" is a machine-writeable and machine-readable device capable of storing electronic data. Electronic data storage device refers to a single electronic data storage device as well as to a collection of two or more electronic data storage devices connected, for example, in series, in parallel, or nested one within another. Examples of electronic data storage devices include, but are not limited to, radio frequency identification tags (RFID tags), proximity (Prox) tags, iButtons, smartcards, and similar devices.

The electronic data storage device 12 may be attached to the job instruction page/job ticket 14 by an adhesive, by a spiral binding, by a removable adhesive, by a magnetic material, by an embedding procedure, by glue, or via some other mechanical attachment method known in the art. Attachment may be permanent or removable. "Attached" and "affixed" as used herein are defined as operatively connected to or in close proximity to. The electronic data storage device 12 may be "embedded" to a writing surface of a document using a process such as Printed Organic Electronics (POE) using a reel-to-reel fabrication process to print the electronic data storage device on a writing surface. By attaching small, inexpensive, electronic data storage devices 12 to paper documents that can store the required electronic information, the advantages of electronic media are merged with the convenience of paper.

To facilitate discussion of the subject system 10, 10', only a single type of EDSD, the RFID tag 12, shall be referred to hereafter in the detailed discussion. Radio frequency identification (RFID) is a method of remotely storing and retrieving data using devices called RFID tags/transponders. An RFID tag is a small object, such as an adhesive sticker, that can be attached to or incorporated into a product. RFID tags contain antennas to enable them to receive and respond to radio-frequency queries from an RFID transceiver.

Figure 1:
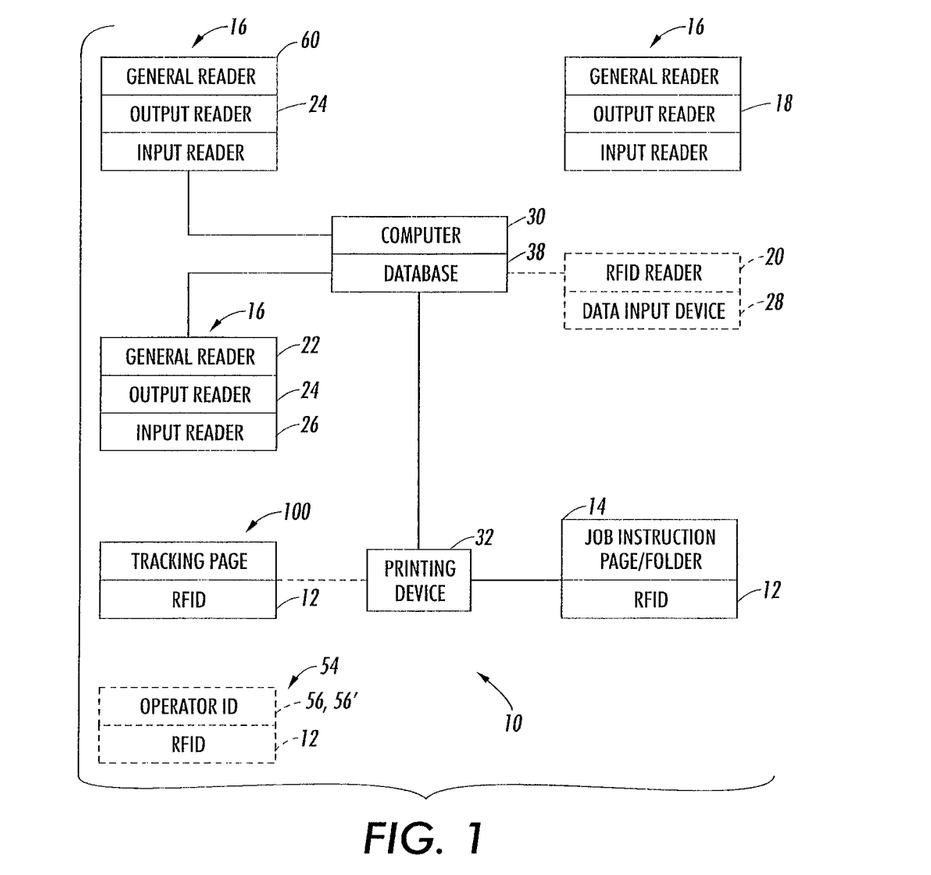
FIG. 1 is a schematic diagram of a first embodiment of a production workflow integration system in accordance with the present disclosure.

FIG. 1 is a schematic view of a first embodiment of a production workflow integration system 10 in accordance with the disclosure. Each workstation 16 of the print shop includes a data collection module 18 having at least one RFID reader 20 to read information stored on RFID tags 12 mounted on a job instruction page/job ticket 14 associated with print job processed by the print shop. To minimize the requirements for operator interaction, the data collection module 18 may include three RFID readers 20: a general reader 22, an output reader 24 and an input reader 26. The input reader 26 may comprise a document tray equipped with an RFID reader 20 for receiving the job instruction pages/job tickets 14 for print jobs that are to be processed in the workstation 16. The output reader 24 may comprise a document tray equipped with an RFID reader 20 for receiving the job instruction pages/job tickets 14 for print jobs that have completed processing in the workstation 16. The general reader 22 may comprise an RFID reader 20 having a sufficient detection range to cover the entire work area of the workstation 16. If less than three RFID readers 20 are utilized, the data collection module 18 will also include a data input module 28, as explained in greater detail below.

A central computer 30 is generally in communication with the data collection modules 18 and a printing device 32. The computer 30 may be connected to any one of the printing device 32 or the data collection modules 18 by a hard-wire connection, a local area network, a wireless local area network, or even via the Internet. The printing device 32 includes a conventional printer, for printing the job instruction page or job ticket, and an EDSD attachment device for attaching an RFID tag 12 to the job instruction page/job ticket 14.

Figure 3:
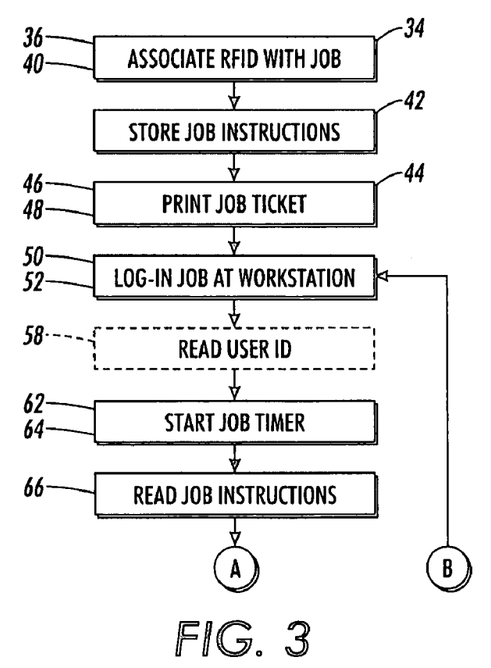
FIGS. 3 and 4 are a flow diagram of the method of operation of the first embodiment of the production workflow integration system.
Figure 4:
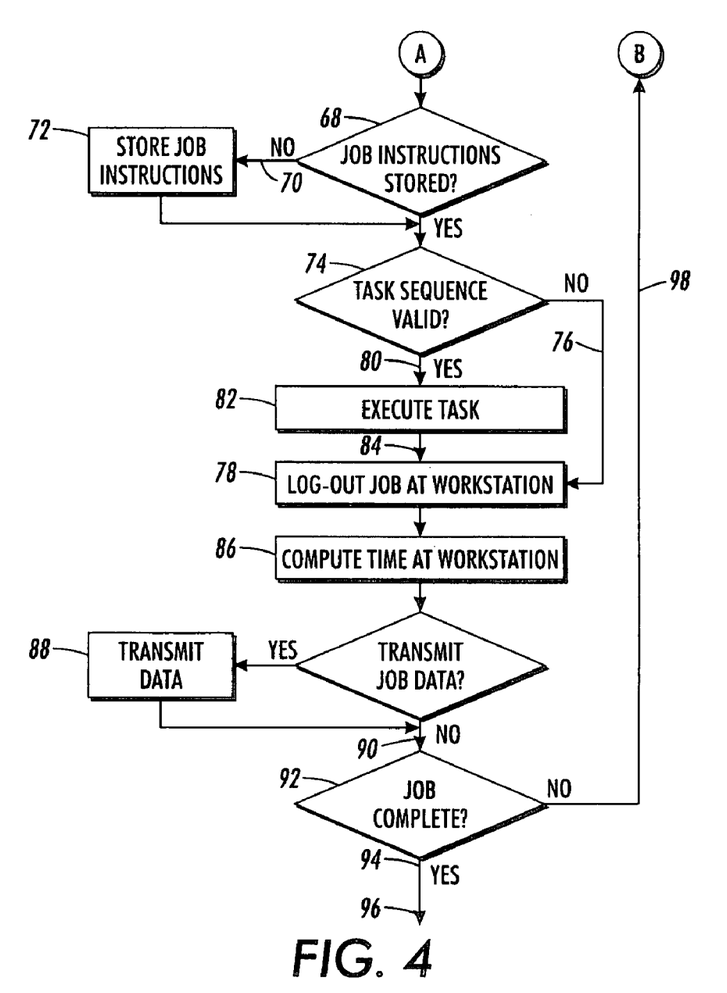

With reference to FIGS. 3 and 4, a job instruction page/job ticket 14 accompanies each print job prepared in the production workflow integration system 10, as the print job is moved from workstation 16 to workstation 16 in the print shop. Accordingly, the method of operation of the first embodiment of the production workflow integration system 10 requires that a job instruction page/job ticket 14 be prepared when a new print job is received by the print shop. To reduce the need for operator action, the RFID tag 12 attached to each job instruction page/job ticket 14 is utilized to deliver job information to programmable workstations, to collect print job production data from the workstations 16, and to collect workflow information. Accordingly, preparation of the job instruction page/job ticket 14 requires that the RFID tag 12 that is or will be attached to the paper utilized in printing the job instruction page/job ticket 14 must be associated 34 with the print job. This is accomplished by opening 36 a record for the print job in a database 38 stored in the central computer 30, and storing 40 the identification information of the RFID tag 12 in a field of the print job record. The print job instructions are then stored 42 in the RFID tag 12, and may be recorded in the database 38.

Job instructions are recorded in a format that is appropriate for consumption by automated systems (for example JDF process instructions). The RFID reader device used to store the job instructions in the RFID tag 12 may be associated with the printing device 32 or a stand-alone device. Operation of this RFID reader device may be controlled by the central computer 30, the printing device controller, or an operator. The job instruction page/job ticket 14 is then printed 44 by the printing device 32. More specifically, the RFID tag 12 is attached 46 to the paper sheet comprising the job instruction page/job ticket if it is not already attached and job instruction information is printed 48 on the paper sheet. Alternatively, RFID tags 12 associated with the job instruction page/job ticket 14 may be reused across jobs if the tags 12 are attached to folders or clipboards used to hold these pages.

Each time the print job is moved within the print shop from workstation 16 to workstation 16, the print job is logged-in 50 at the workstation 16 by scanning 52 the RFID tag 12 attached to the job instruction page/job ticket 14. If the workstation data collection module 18 includes an input reader 26, the RFID tag 12 may be scanned 52 by placing the job instruction page/job ticket 14 in the associated document tray. If the workstation data collection module 18 includes only general reader 22, the RFID tag 12 is scanned 52 by the general reader 22 and the operator utilizes the data input module 28 to identify that the job instruction page/job ticket RFID tag 12 is being logged-in 50.

As shown in FIG. 1, the identification badges 54 for the print shop operators may include an RFID tag 12 having identification information 56 for the operator stored therein. Alternatively, the RFID tag 12 may include information 56' that only identifies the role of the operator but does not identify the person. If the RFID tag 12 of such an operator identification badge 54 is sensed by the general reader 22, the operator identification information is read 58 and temporarily stored at the workstation 16. The workstation controller 60 may also initiate 62 an operator timer to record the total time of the interaction between the operator and the workstation 16. The workstation controller 60 then initiates 64 a job timer associated with the print job to time how long the print job remains at the workstation 16. The workstation operator information and print job residence time may be used for accounting purposes. Such information may also be used to study the workflow patterns of the print shop in order to develop improved workflow methodologies.

The workstation controller 60 then reads 66 the job instructions stored in the job instruction page/job ticket RFID tag 12 and compares 68 these job instructions to the job instructions stored in the workstation controller 60. If the job instructions read from the job instruction page/job ticket RFID tag 12 are not identical 70 to those stored in the workstation controller 60, the new job instructions may be saved 72 to the workstation controller memory for utilization with the print job.

As part of the job planning process, instructions are prepared on how the print job is to be completed with the available print shop equipment. Frequently, the tasks required to complete the print job must be performed in a specific sequence. If the operator fails to do so, and the tasks are performed out of sequence, the print job may need to be redone. For example, if the print job is required to be cut before binding, and the operator mistakenly binds the print job before cutting, the entire print job must be redone. Accordingly, the job instructions read from the job instruction page/job ticket 14 may be used to validate 74 the task sequence. For example, if a print job is logged-into a cutting station, the system 10 verifies that the cutting process is the next process required in the proper execution of the job instructions. If the process performed at the workstation is not 76 the process that should be performed next for the print job, the operator is directed to log-out 78 the print job from the workstation 16 and to proceed to the correct workstation 16. If the process performed at the workstation is the correct process 80 that should be performed next for the print job, the workstation controller 60 executes 82 the process.

When the workstation 16 completes 84 its process, the operator is directed to log-out 78 the print job from the workstation 16. If the workstation data collection module 18 includes an output reader 24, the print job may be logged-out 78 by placing the job instruction page/job ticket 14 in the associated document tray. If the workstation data collection module 18 includes only general reader 22, the RFID tag 12 is scanned by the general reader 22 and the operator utilizes the data input module 28 to identify that the job instruction page/job ticket 14 is being logged-out 78.

The workstation controller 60 then computes 86 the residence time of the print job using the job timer. If the workstation 16 is connected to the central computer 30, the workstation controller 60 transmits 88 the print job data to the central computer 30. If the workstation 16 is not connected to the central computer 30, the workstation controller 60 records 90 the print job data in the job instruction page/job ticket RFID 12. In this case, the information is synchronized with the central computer 30 when the print job is moved to a workstation 16 that is connected to the central computer 30 or at the completion of the print job.

If the workstation 16 is connected to the central computer 30, the central computer 30 then determines 92 whether the print job has been completed. If the workstation 16 is not connected to the central computer 30, the workstation controller 60 uses the print job information stored in the job instruction page/job ticket RFID tag 12 to determine whether the print job has been completed. If the print job has been completed 94 and the last workstation 16 is connected to the central computer 30, the print job data stored in the job instruction page/job ticket RFID tag 12 is synchronized with the data stored in the database 38 and the central computer 30 terminates the print job. If the print job has been completed and the last workstation 16 is not connected to the central computer 30, the workstation controller directs 96 the operator to synchronize the print job data stored in the job instruction page/job ticket RFID tag 12 with the data stored in the database 38 and the central computer 30 terminates the print job. If the print job has not been completed 98, the system 10 prompts the operator to take the print job to the next workstation 16.

Optionally, the system 10 may utilize a tracking page 100 having an attached RFID tag 12 to track the work in progress in the processing of a print job. The tracking page 100 may be printed by the printing device 32 at the start of a print job or at any point during a print job. For example, if a print job includes pages printed at a black and white printer and color pages printed at a color printer, a tracking page 100 may be printed to track each portion of the print job. As described above, the RFID tags 12 for each of the tracking pages 100 are associated 34 with the print job. For additional efficiency one of the RFID tags 12 may be associated 34 with the black and white portion of the print job and the other RFID tag 12 may be associated 34 with the color portion of the print job. The tracking page 100 is logged-in 50 and logged-out 78 when the job instruction page/job ticket 14 is logged-in 50 and logged-out 78 in the manner discussed above as the portions of the print job are moved throughout the print job, allowing the location of each print job portion to be tracked.

Figure 2:
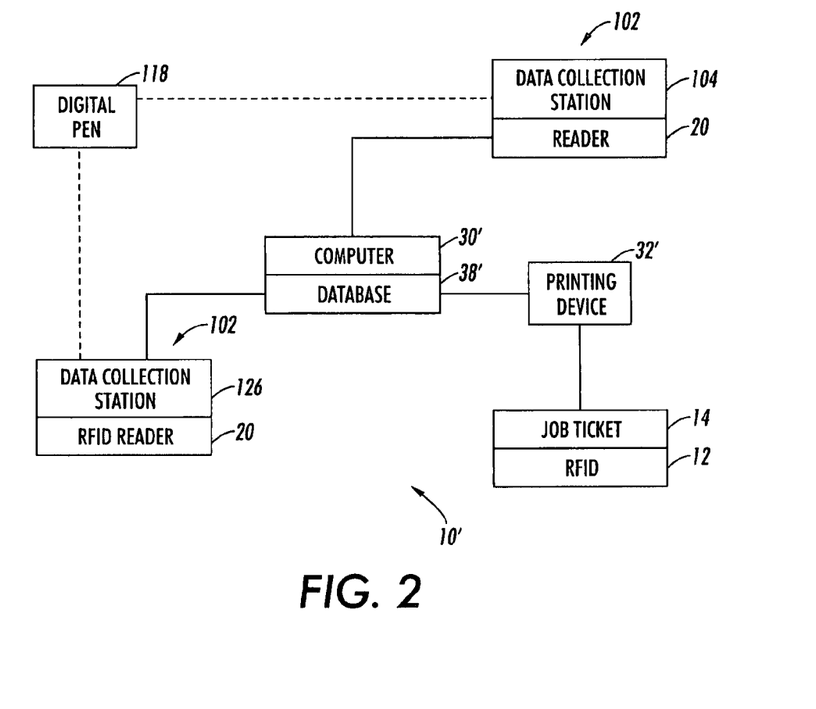
FIG. 2 is a schematic diagram of a second embodiment of a production workflow integration system in accordance with the present disclosure.

FIG. 2 is a schematic view of a second embodiment of a production workflow integration system 10' in accordance with the disclosure. In this embodiment, the print shop contains data collection stations 102 that include a data collection module 104 having at least one RFID reader 20. A data collection station 102 may be a part of one of the print shop workstations, or the data collection station 102 may be a stand-alone unit that is not associated with any other piece of print shop apparatus. A central computer 30' is generally in communication with each data collection station 102 and a printing device 32'. The computer 30' may be connected to any one of the printing device 32' or the data collection stations 102 by a hard-wire connection, a local area network, a wireless local area network, or even via the Internet. The printing device 32' includes a conventional printer, for printing the job instruction page/job ticket 14, and an EDSD attachment device for attaching an RFID tag 12 to the job instruction page/job ticket 14.

The second embodiment of the production workflow integration system 10' provides the ability to collect near real-time data from personnel and/or equipment in a print shop that is not capable of electronically gathering and/or submitting all data related to a print job. For example, data may be captured for manual operations, such as manual stuffing or folding and computer-assisted operations, such as non-automated preflight operations. The method of using the second embodiment of the production workflow integration system 10' allows the print job data to be collected in a manner that mirrors the conventional data collection methodology that is used in these situations, writing the data on the job ticket. As such, there is no need to add troublesome additional steps to any existing workflow in a print shop.

Figure 5:
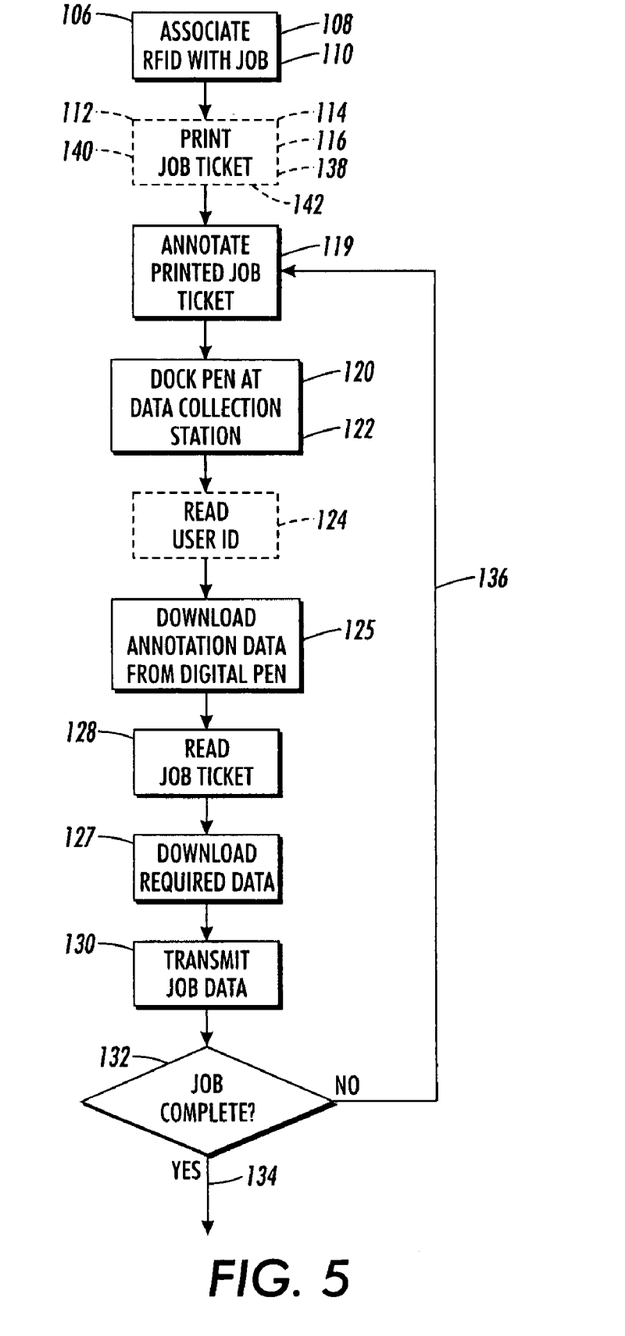
FIG. 5 is a flow diagram of the method of operation of the second embodiment of the production workflow integration system.

With reference to FIG. 5, a job instruction page/job ticket 14 accompanies each print job prepared in the production workflow integration system 10', as the print job is moved from workstation to workstation in the print shop. Accordingly, the method of operation of the second embodiment of the production workflow integration system 10' also requires that a job instruction page/job ticket 14 be prepared when a new print job is received by the print shop. Preparation of the job instruction page/job ticket 14 requires that the RFID tag 12 that is or will be attached to the paper utilized in printing the job instruction page/job ticket must be associated 106 with the print job. This is accomplished by opening 108 a record for the print job in a database 38' stored in the central computer 30', and storing 110 the identification information of the RFID tag 12 in a field of the print job record. In a first variation, the job instruction page/job ticket 14 is then printed 112 by the printing device 32'. More specifically, the RFID tag 12 is attached 114 to the paper sheet comprising the job instruction page/job ticket if it is not already attached and job instruction information is printed 116 on the paper sheet. In a second variation, the job instruction page/job ticket 14 is a pre-printed form that either has an attached RFID tag 12 or to which an RFID tag 12 is attached by the printing device 32'. Printing the job instruction page/job ticket, rather than using a pre-printed job instruction page/job ticket provides the capability of customizing the information for each specific print job. In either variation, the job instruction page/job ticket if formatted to be read by the digital pen 118 as the digital pen 118 is used to enter the print job information in specific fields of the job instruction page/job ticket 14, allowing the digital pen 118 to associate such data with the job instruction page/job ticket field. The print job information may be printed on a digital-pen-enabled print media or embedded onto the print media, or both.

As the print job moves through the print shop, and is acted upon at various workstations within the shop, the operator utilizes the digital pen 118 to annotate 119 the printed job instruction page/job ticket 14 with information concerning the print job. The operator docks 120 the digital pen 118 at the data collection station 102 associated with the workstation 16 and the data collection station reader 20 scans 122 the RFID tag 12 attached to the job instruction page/job ticket 14. If the identification badges for the print shop operators include an RFID tag 12, the operator identification information is read 124 and temporarily stored at the data collection station 102. The operator downloads 125 the print job annotations from the digital pen to the data collection station (including the X-Y coordinates of the marks appearing in the appropriate data fields of the job instruction page/job ticket 14) and downloads 128 the data stored in the RFID tag 12. The data collection station controller 126 queries 127 the central computer 30' for information about the print job, including the X-Y coordinates for the data fields on the job instruction page/job ticket 14. The data collection station controller 126 transmits 130 the data from the digital pen 118, the identification data read from the RFID tag 12 to the central computer 30'. The data transmitted by the data collection station 102 is stored in the print job database 38', along with any meta-information regarding the data collection station 102, the digital pen 118, and the operator that has been gathered tangentially. The identification information scanned from the RFID tag 12 attached to the job instruction page/job ticket 14 facilitates associating the data with the specific print job. In turn, the X-Y coordinate obtained information from the central computer 30' facilitates associating the data collected by the digital pen 118 with the data to be stored in the central computer 30'. While the digital pen 118 is docked at the data collection station 102, the data collection station controller 126 may query the central computer 30' for updated information on the print job, and alert the operator via a data collection station video display if the central computer 30' contains new job information.

The data collection station controller 126 uses the print job information stored in the job instruction page/job ticket RFID tag 12 to determine 132 whether the print job has been completed. If the print job has been completed 134, either the data collection station 102 or the central computer 30' notifies the operator that the print job has been completed and the print job is terminated. If the print job has not been completed 136, the system 10' prompts the operator to take the print job to the next workstation.

A digital pen 118 is able to capture written information, in part, by locating the point of contact of the stylus on the page of data. This property is used in a first variation of the read job ticket routine 128 to differentiate "applicable data" from "non-applicable data". When the job instruction page/job ticket 14 is printed 112, page location information for all of the printed data is stored 138 in the print job database 38'. If a standard pre-printed job instruction page/job ticket 14 is used, the job instruction page/job ticket 14 is identified 140, allowing the data field locations for the standard form to be associated 142 with the print job record. Data input locations are designated on the job ticket, and users are required to enter data only in those locations. When the job instruction page/job ticket 14 is scanned 128 by the digital pen 118, this page location information is used by the data collection station 102 to interpret what specific data is being scanned with the digital pen 118.

For example, one such a job instruction page/job ticket 14 may be formatted as shown below:

Prepress: Proofing (pages) (A)
   Work with Customer (minutes) (B)
   Preflight (minutes) (C)
Press: Waste (impressions) (D)
   Waste (sheets) (E)
Postpress: #cuts (F)
   Cutter Start Time (G)
   Cutter Stop Time (H)
   Waste (sheets) (I)

While another job instruction page/job ticket, from the same shop but for a different job, may be formatted as shown below:

Prepress: Design (minutes) (A)
   Prepare for printer (minutes) (B)
Press: Overs (impressions) (C)
   Overs (sheets) (D)
Postpress: # folds (E)
   Folder setup waste (sheets) (F)

It should be appreciated that the data to be collected was different between the two job tickets 14. The data requested in positions "A" to "I" and "A" to "F" is recorded in the database 38', and coordinated by the data collection station 102.

In a second variation of the read job ticket routine 128, specific character sequences are assigned specific meanings. In this "Data Coding" method, the operator may be instructed to start each data entry with a specific alpha character designating the operation that was performed, followed by an equal sign, followed by a quantity for that operation. In this example, the shop rules may dictate that the letter "A" designates preflight operations, "B" designates color proof sheets, "C" designates author alterations, "D" designates hand stuffing, and so on. An operator entry of "A=35", for example, would indicate that 35 minutes were spent preflighting the job. An entry of "B=3" would indicate that 3 color proof sheets were created for the job.

It should be appreciated that the second embodiment 10' may be combined with the first embodiment 10, providing a system having workstations 16, data collection stations 102 and digital pens 118.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A production workflow integration system for a print shop comprises:
    a plurality of workstations, each workstation including a data collection module having at least one of an electronic data storage device reader;
    a printing device adapted to print a job ticket for a print job to be produced by the print shop; and
    a computer in communication with at least one of the workstations and the printing device, the computer including a database stored in a memory;
    wherein, the computer stores print job instructions associated with the print job to be produced by the print shop on an electronic data storage device attached to the job ticket associated with the print job and stores identification information of the electronic data storage device in a field of a print job record associated with the print job in the database.

2. The production workflow integration system of claim 1 wherein the printing device includes:
    a printer to print a job instruction page, and
    an electronic data storage device attachment device for attaching an electronic data storage device to the job ticket.

3. The production workflow integration system of claim 1 wherein the data collection module of at least one of the workstations includes:
    a general electronic data storage device reader;
    an output electronic data storage device reader; and
    an input electronic data storage device reader.

4. The production workflow integration system of claim 3 wherein the input electronic data storage device reader comprises a document tray, having an electronic data storage device reader, adapted to receive job tickets for print jobs that are to be processed in the workstation.

5. The production workflow integration system of claim 4 wherein the output electronic data storage device reader comprises a document tray, having an electronic data storage device reader, adapted to receive the job tickets for the print jobs that have completed processing in the workstation.

6. The production workflow integration system of claim 1 further comprising at least one operator identification badge including an electronic data storage device having identification information for an operator stored therein.

7. The production workflow integration system of claim 1 further comprising at least one tracking page including an electronic data storage device associated with the print job.

8. The production workflow integration system of claim 7 wherein the electronic data storage device is also associated with a process to be performed for the print job.

9. The production workflow integration system of claim 1 further comprising:
    a digital pen; and
    at least one data collection station including a data collection module having at least one electronic data storage device reader.

10. The production workflow integration system of claim 9 wherein the job ticket is formatted to be read by the digital pen.

11. A method of integrating production work flow in a print shop having a plurality of workstations, each of the workstations performing at least one print job task, the method comprising:
    printing a job ticket for each print job received by the print shop;
    associating an electronic data storage device attached to the job ticket with the print job, the electronic data storage device having identification information stored therein;
    logging in the job ticket at each workstation performing work on the print job by scanning the identification information stored in the electronic data storage device attached to the job ticket; and
    executing the print job task performed by the workstation.

12. The method of claim 11 further comprising:
    storing print job instructions for the print job in the electronic data storage device.

13. The method of claim 12 further comprising:
    opening a record for the print job in a database stored in a computer; and
    storing the identification information of the electronic data storage device in a field of the print job record.

14. The method of claim 13 further comprising recording the print job instructions for the print job in a field of the print job record.

15. The method of claim 13 further comprising reading user identification information at the workstation from an electronic data storage device associated with an identification badge of a user operating the workstation.

16. The method of claim 15 further comprising initiating an operator timer to record total time of interaction between an operator and the workstation.

17. The method of claim 13 further comprising:
reading the job instructions stored in the electronic data storage device;
comparing the job instructions read from the electronic data storage device to job instructions stored in a controller of the workstation;
saving the job instructions read from the electronic data storage device in the controller of the workstation if the job instructions read from the electronic data storage device are not identical to the job instructions stored in the controller of the workstation; and
executing the job instructions stored in the controller of the workstation.

18. The method of claim 13 further comprising:
determining whether the print job task performed at the workstation is a next process required in a proper execution of the job instructions; and
directing an operator to log-out the print job from the workstation if the print job task performed at the workstation is not the print job task that should be performed next for the print job; or
executing the print job task if the print job task performed at the workstation is the print job task that should be performed next for the print job.

19. The method of claim 13 further comprising:
initiating a job timer associated with the print job after the job ticket is logged-in at the workstation;
logging-out the print job from the workstation when the print job task is completed by scanning the electronic data storage device; and
computing residence time of the print job at the workstation using the job timer.

20. The method of claim 13 further comprising;
transmitting print job data from the workstation to the computer if the workstation is connected to the computer; or
recording the print job data in the electronic data storage device if the workstation is not connected to the computer; and
transferring the print job data recorded in the electronic data storage device to the computer when the print job is moved to a workstation that is connected to the computer or at the completion of the print job.

21. The method of claim 13 further comprising:
printing the job ticket in a digital pen readable format; and
entering print job information on the job ticket with a digital pen, the digital pen reading the print job information and associating the print job information with the job ticket.

22. The method of claim 21 wherein the print shop also has at least one data collection station, the method further comprising:
periodically docking the digital pen at the at least one data collection station as the print job is processed in the print shop; and
scanning the electronic data storage device with a data collection station reader.

23. The method of claim 22 further comprising:
transmitting the print job information read by the digital pen and the identification information scanned by the data collection station reader to the computer;
associating identification information with the print job information; and
storing the print job information in the print job record of the database.

24. A method of integrating production work flow in a print shop having a plurality of workstations and at least one data collection station, each of the workstations performing at least one print job task, the method comprising:
printing a job ticket for each print job received by the print shop, the job ticket being printed in a digital pen readable format;
associating an electronic data storage device attached to the job ticket with the print job, the electronic data storage device having identification information stored therein;
entering print job information on the job ticket with a digital pen, the digital pen reading the print job information and associating the print job information with the job ticket;
periodically docking the digital pen at the at least one data collection station as the print job is processed in the print shop; and
scanning the job ticket electronic data storage device with a data collection station reader.

25. The method of claim 24 further comprising:
opening a record for the print job in a database stored in a computer; and
storing the identification information of the electronic data storage device in a field of the print job record.

26. The method of claim 25 further comprising:
transmitting the print job information read by the digital pen and the identification information scanned by the data collection station reader to the computer;
associating identification information with the print job information; and
storing the print job information in the print job record of the database.

27. The method of claim 26 further comprising:
logging in the job ticket at each workstation performing work on the print job by scanning the identification information stored in the electronic data storage device attached to the job ticket;
executing the print job task performed by the workstation; and
logging-out the print job from the workstation when the print job task is completed by scanning the electronic data storage device.

28. A production workflow integration system for a print shop comprises:
at least one workstation, each workstation including a data collection module having at least one of an electronic data storage device reader;

a printing device adapted to print a job ticket for a print job to be produced by the print shop;

a computer in communication with the at least one of the workstation and the printing device, the computer including a database stored in a memory;

a digital pen; and at least one data collection station including a data collection module having at least one of electronic data storage device reader;

wherein, the computer stores print job instructions associated with the print job to be produced by the print shop on an electronic data storage device attached to the job ticket associated with the print job and stores identification information of the electronic data storage device in a field of a print job record associated with the print job in the database.

* * * * *